March 27, 1962 D. E. QUINLAN 3,027,422

TELEVISION SYNCHRONIZING SYSTEM

Filed Aug. 7, 1959 2 Sheets-Sheet 1

INVENTOR.
DONALD E. QUINLAN
BY Darby & Darby
ATTORNEYS

March 27, 1962 D. E. QUINLAN 3,027,422

TELEVISION SYNCHRONIZING SYSTEM

Filed Aug. 7, 1959 2 Sheets-Sheet 2

INVENTOR.
DONALD E. QUINLAN
BY Darby & Darby
ATTORNEYS.

United States Patent Office 3,027,422
Patented Mar. 27, 1962

3,027,422

TELEVISION SYNCHRONIZING SYSTEM

Donald E. Quinlan, Lincoln Park, N.J., assignor, by mesne assignments, to Fairchild Camera and Instrument Corporation, Syosset, N.Y., a corporation of Delaware Filed Aug. 7, 1959, Ser. No. 832,338
8 Claims. (Cl. 178—69.5)

This invention relates to a television system, and more particularly to the portion thereof that produces the synchronizing waveform.

In order to better understand my invention, the following general review of television is given as background, with special reference to the synchronizing signals.

The basic concept of television is that of breaking up a scene into separate horizontal lines, and transmitting these lines. The receiver recreates these lines, and positions them beneath each other, the final display resembling a picture painted on the closed slats of a Venetian blind. If some of these imaginary slats were to be horizontally displaced, the vertical parts of the picture would not line up and a jagged picture would result. A similar distortion actually occurs in a television display when the lines thereof are horizontally displaced. To prevent this, a train of "horizontal synchronizing signals" is transmitted, and the receiver uses these cyclically recurring signals to control the horizontal oscillator that aligns the horizontal lines of the display. These horizontal sync signals, designated as "*h*," occur at the end of every horizontal line and thus at a time interval of one horizontal line (1H) apart.

Present day television systems send thirty complete pictures, or "frames," every second, and the receiver must start each of its displays at the correct instant. In order to advise the receiver when to start a new display, the transmitter sends out "vertical synchronizing signals" designated by "*v*," and having specific outline requirements.

Due to the circuitry of the receiver, the aforementioned horizontal oscillator may wander during the presence of the vertical sync signal. To prevent this, the latter is "serrated" at predetermined intervals, so that the serrations may be used as interim horizontal sync signals to prevent wandering of the horizontal oscillator.

In the early stages of television, much consideration was given to the type of display that should be presented. If one complete display is shown, and followed by a second complete display, this presentation, known as a "sequential frame" presentation, produces flicker, and causes movements to appear jerky. To overcome this, various authorities agreed that the first display should comprise only the odd numbered lines, and should then be followed by a second display consisting of the even numbered lines. This type of display is known as "interlaced," and minimizes flicker and jerkiness of movement. In order to provide interlace, alternate vertical sync signals occur 1H from the preceding horizontal sync signal, while the in between sync signals occur ½H from the preceding horizontal sync signal. This relation will be more fully discussed hereinafter. To achieve perfect interlace, signals known as "equalizing" pulses are introduced before and after the vertical sync signal.

Since every home type television receiver must be capable of producing displays from any commercial television station, the waveform that includes the various synchronizing and equalizing signals has been standardized, and is transmitted by every station. This standardized synchronizing waveform is well known, and is fully described in various publications, such as "Practical Television Engineering" by Scott Helt, and "Television for Radiomen" by Edward Noll. It therefore will not be shown or described, the various terms associated therewith being used in their accepted meaning.

An outgrowth of entertainment television has been the introduction of individual, self-contained television systems that are not telecast to the general public, but are used by educators, industry, and other fields. These "closed circuit" television systems bring the activities of an individual, such as a teacher or a surgeon, to a multitude of viewers or bring a number of remote or dangerous scenes to the attention of a single observer. For example, one guard using industrial television, can watch several entrances and exits of a plant. Similarly, an operator at an atomic reactor can observe operations at remote dangerous areas. Since these closed circuit television systems are completely self-contained, it is unnecessary for them to use the standardized synchronizing signal waveform. They may instead, use their own synchronizing waveforms that are either simpler to generate, or more convenient to use. This approach, however, requires special receivers and signal generators for such specialized industrial systems, rather than those readily available on the open market.

I have found that for closed circuit television systems, and indeed for commercial television systems, the equalizing pulses may be eliminated with very little, if any, degradation of the display. Once these pulses are eliminated, I have found that the necessary synchronizing waveform can be produced by very simple circuitry, and that commercially available circuitry and equipment can be readily used for generating the signals, and for producing the display.

It is therefore the principal object of my invention to provide an improved synchronizing waveform generator.

The attainment of this object and others will be realized from the following specification, taken in conjunction with the drawings, in which.

My invention contemplates the application of suitable waveforms and gating pulses to two dual control electron devices in order to produce a synchronizing waveform that does not have any equalizing pulses, but may be produced and used by commercially available circuitry and equipment.

Figure 1:
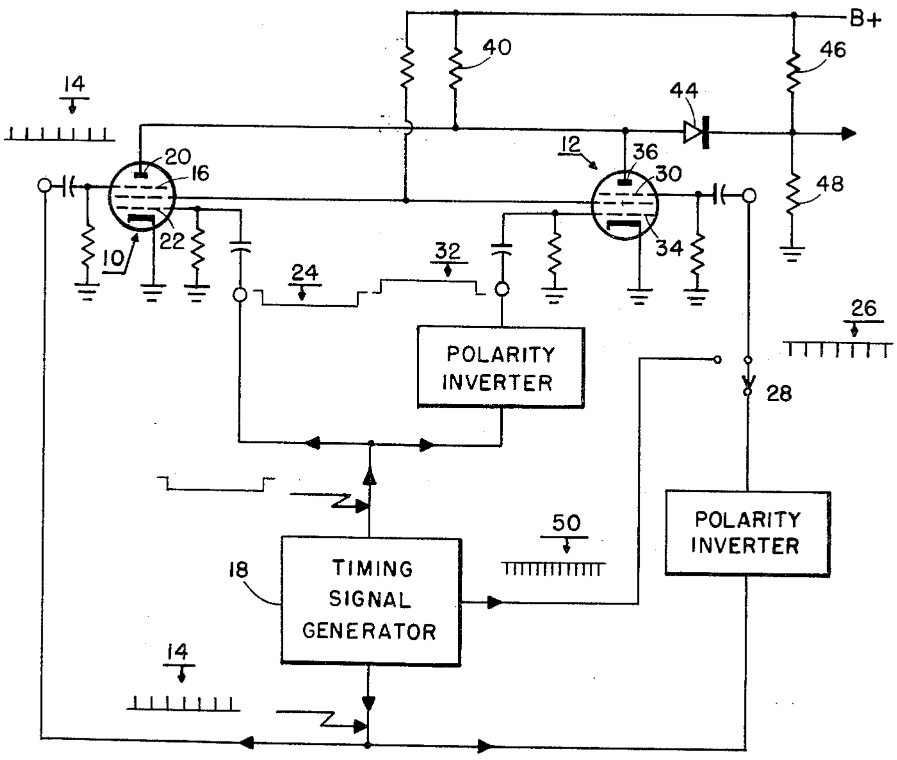
FIG. 1 shows a schematic diagram of my invention.

My invention is shown in FIG. 1, wherein two electron tubes 10 and 12 are of the dual control type, as exemplified by the 6AS6 electron tube. These tubes are generally multi-grid tubes, wherein the suppressor grids are carefully formed so that a signal may be applied to them, permitting them to function as a second control grid. Generally speaking, signals may be applied to either of the control grids, but in some tubes the interelectrode capacitance is such that the higher frequency signal is preferably applied to the suppressor grid.

In my circuit, as shown in FIG. 1, tube 10 is normally conductive. A waveform 14, having positive-going pulses that occur at the rate of 15,750 per second, is applied continuously to suppressor grid 16. Waveform 14 has the same repetition rate, frequency, amplitude, rise-time, etc., as the standardized horizontal synchronizing signals previously discussed, and any well known timing signal generating circuit 18 may be used as a source. As tube 10 is normally conductive, waveform 14 would tend to produce at anode 20 a continuous train of negative-going pulses that correspond to the horizontal synchronizing pulses of the standardized synchronizing waveform.

I produce a gap in the train of pulses by cutting off tube 10 specifically by applying to its control grid 22 a negative-going "gate" 24, this gate having a duration of 6 horizontal lines. A gate having these characteristics is used in the generation of the standardized waveform, and circuitry for producing gate 24 is therefore well known. Tube 10 therefore produces at its anode 20, a train of horizontal pulses which are interrupted, or gapped, as shown by waveform 25 of FIG. 2.

Referring back to FIG. 1, tube 12 acts in a somewhat similar manner, the difference being caused by the fact that it is normally non-conducting. A waveform 26, which is an inverted facsimile of waveform 14, is applied continuously to suppressor grid 30. Since tube 12 is normally cut off, waveform 26, per se, does not produce any output signal.

I control the state of tube 12 by means of a second "gate" 32 applied to control grid 34. This gate also has a duration of 6 horizontal lines, and is an inverted facsimile of previously described gate 24. It turns on tube 12. Tube 12 therefore acts as an adder, or mixer, and combines waveforms 26 and 32 to produce at its anode 36 output waveform 38 of FIG. 2. Waveform 38 has the outline requirements of the standardized vertical synchronizing signals, and is suitably serrated to provide interim horizontal sync signals.

Figure 2:
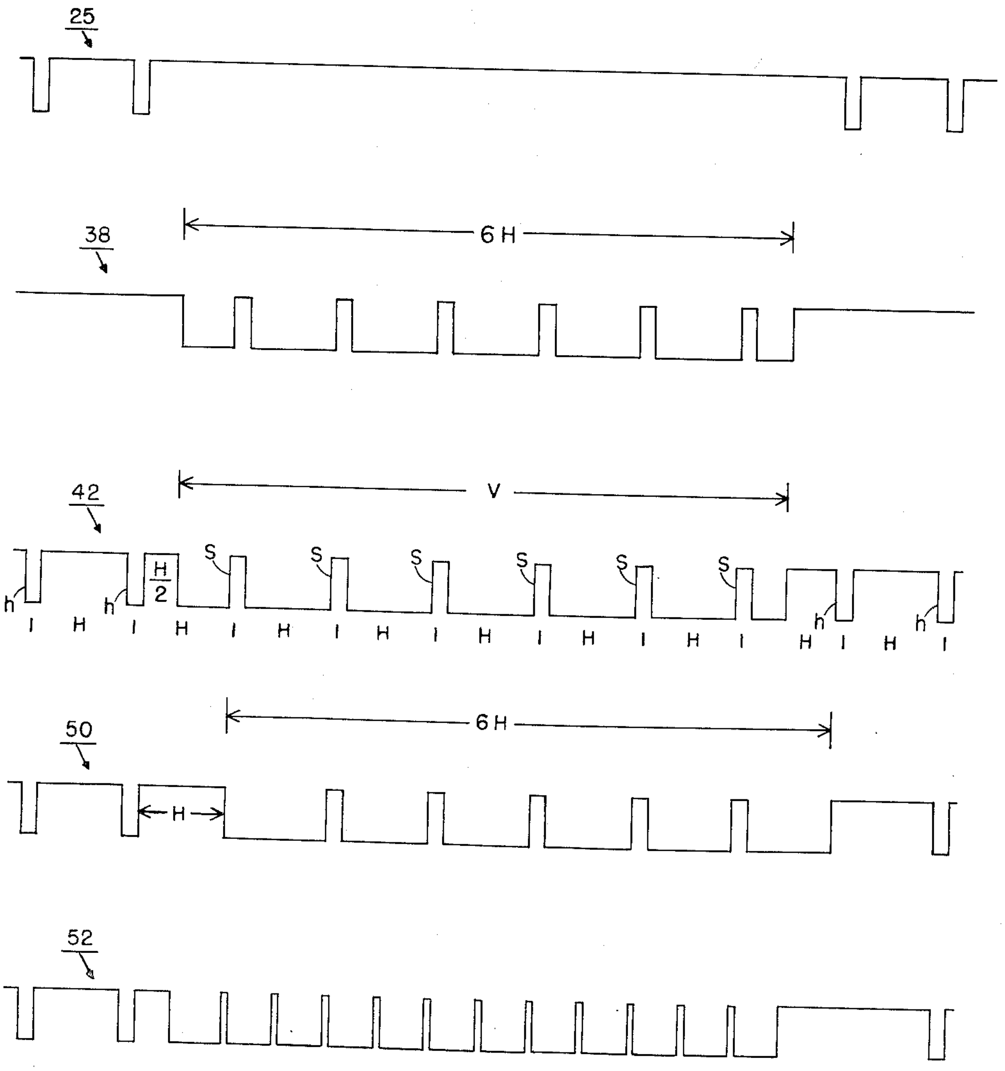
FIG. 2 illustrates various waveforms that occur in different parts thereof.

Tubes 10 and 12 have a common load resistance 40 of FIG. 1, that combines waveforms 25 and 38 to produce waveform 42, shown in FIG. 2. Composite waveform 42 is produced as follows. The upper limits of waveforms 25 and 38 are produced when tubes 10 and 12 are cut off, and are therefore equal to B+. The lower limits of waveforms 25 and 38 depend upon the amplification of tubes 10 and 12, and these may be different. To assure evenness of the lower edge of waveform 42, a clipping diode 44 is used in the circuit of FIG. 1. A voltage divider comprising resistances 46 and 48 establishes a bias for diode 44, and any portions of waveform 42 below this level are clipped off.

A study of waveform 42 in FIG. 2 will show that it has a number of important characteristics that permit it to be used as a synchronizing waveform. Firstly, it comprises a train of signals *h* that conform to the requirements of the standardized horizontal sync signals. Secondly, waveform 42 has a portion *v* whose overall outline conforms to the standardized vertical sync signal. Thirdly, the vertical sync portion has serrations, the horizontal sync signals and the serrations both coinciding timewise with the short vertical lines (1H apart) that indicate when it is necessary to trigger the horizontal oscillator. Thus, waveform 42 has the necessary outline, repetition rate, height, risetime, and other characteristics. Well known circuitry, described on pages 206–209 of the above Noll book, uses the frequency of the horizontal sync signals and of the serrations to prevent wandering by the horizontal oscillator. It will be noted that if the 6H gates 24 and 32 occur a little earlier or a little later, the starting time and terminating time of the vertical sync signal "*v*" are moved, but the serrations are still properly spaced to assure proper operation of the horizontal oscillator.

It was previously pointed out that the display could be frame sequential, or could be interlaced. To produce a sequential frame display, the start of the vertical synchronizing signal occurs at the end of certain lines, i.e., it starts 1H from the preceding horizontal sync signal. The resultant synchronizing waveform 50 would therefore appear as shown in FIG. 2. It will be noted that a horizontal sync signal is "lost" at the start and end of the vertical sync signal, but the horizontal oscillator is capable of proper operation during this short interval, since it is properly triggered soon thereafter.

For an interlaced display, alternate vertical sync signals occur 1H after the preceding horizontal sync signal, and therefore correspond to waveform 50. The in-between vertical sync signals occur ½H after the preceding horizontal sync signal, and therefore correspond to waveform 42. In both cases, the horizontal sync signals and the serrations maintain the operation of the horizontal oscillator, and the vertical sync signals maintain the operation of the vertical oscillator.

Under some conditions, waveform 52 of FIG. 2 may be desired because the vertical sync signal is serrated at twice the frequency compared to waveforms 42 and 50. This waveform is easily achieved by throwing switch 28 of FIG. 1 to its other position, and applying the standardized equalizing signals to grid 30.

Thus, due to my invention, satisfactory synchronizing waveforms may be produced with extremely simple circuitry.

What is claimed is:

1. A waveform generator comprising: a normally conductive control tube having first and second control electrodes and an output electrode; means applying a continuous train of horizontal sync pulses to said first control grid of said tube, said pulses being 1H apart; means supplying a cutoff gate signal to said second control grid of said tube, said gate having a duration of 6H, whereby said tube is cut off for said duration and a gapped train of horizontal sync pulses in inverted form appears at said output electrode; a second, normally off, control tube having first and second control electrodes and an output electrode; means applying a train of pulses coinciding and inverted with respect to said horizontal sync pulses to one of said control grids of said second tube; means applying said cutoff gate in inverted form to the other said control grid of said second tube to cause said second tube to conduct for said duration, whereby a serrated gate signal having horizontal sync pulses appears at said output electrode of said second tube; and common load means combining the outputs of said output electrodes.

2. The device of claim 1 wherein said coinciding pulses are equalizing pulses ½H apart to provide interlace signal for a composite television synchronizing waveform.

3. A waveform generator comprising: a normally conductive control tube having an anode, a control grid, and a suppressor grid; means applying a continuous train of positive-going horizontal sync pulses to said suppressor grid; means applying a cutoff gate signal to said control grid, whereby said tube is cutoff for the duration of said gate signal and a gapped train of negative-going horizontal sync pulses appears at said anode; a second, normally off, control tube having an anode, a control grid, and a suppressor grid; means applying said train of horizontal sync pulses in inverted form to said suppressor grid of said second tube; means applying said cutoff gate in inverted form to said control grid of said second tube to cause said second tube to conduct for said duration, whereby a serrated gate signal having horizontal sync pulses appears at said anode of said second tube; means combining the outputs of said anodes to produce a composite television synchronizing waveform without equalizing pulses, said combining means comprising: a source of potential, a connection between said anodes, and a load resistance connected between said source and said connection; and means maintaining a constant amplitude of said combined output.

4. A waveform generator comprising: a normally conductive control tube having an anode, a control grid, and a suppressor grid; means applying a continuous train of positive-going horizontal sync pulses to said suppressor grid; means applying a cutoff gate signal to said control grid, whereby said tube is cut off for the duration of said gate signal and a gapped train of negative-going horizontal sync pulses appears at said anode; a second, normally off, control tube having an anode, a control grid, and a suppressor grid; means applying said train of horizontal sync pulses in inverted form to said suppressor grid of said second tube; means applying said cutoff gate in inverted form to said control grid of said second tube to cause said second tube to conduct for said duration, whereby a serrated gate signal having horizontal sync pulses appears at said anode of said second tube; means combining the outputs of said anodes, said combining means comprising: a source of potential, a connection between said anodes, and a load resistance connected between said source and said connection; a clipping diode having one electrode thereof connected to said connection, whereby the amplitude of said combined output is maintained constant; a voltage divider connected across said source of potential; and a connection between the second electrode of said diode and a point on said voltage divider, whereby the clipping level of said diode may be established.

5. The device of claim 4 wherein said horizontal sync pulses are 1H apart and said gate signal has a duration of 6H.

6. A waveform generator comprising: a timing signal generator supplying a train of positive-going horizontal sync pulses 1H apart, a train of negative-going equalizing pulses ½H apart, and a gating signal having a duration of 6H; a normally conductive control tube having an anode, a control grid, and a suppressor grid; means applying said train of horizontal sync pulses to said suppressor grid; means applying said gating signal to said control grid to cut off said first tube for said duration of said gating signal, whereby a gapped train of negative-going horizontal sync pulses appears at said anode; a second, normally off, control tube having an anode, a control grid, and a suppressor grid; means applying said train of equalizing pulses to said suppressor grid of said second tube; means applying said gating signal in inverted form to said control grid of said second tube to turn on said second tube for said duration of said gating signal, whereby a serrated gating signal having positive-going equalizing pulses appears at said anode of said second tube; means combining the outputs of said anodes, said combining means comprising: a source of potential, a connection between said anodes, and a load resistance connected between said source and said connection; a clipping diode having one electrode thereof connected to said connection, whereby the amplitude of said combined output is maintained constant; a voltage divider connected across said source of potential; a connection between the second electrode of said diode and a point on said voltage divider, whereby the clipping level of said diode may be established.

7. A waveform generator comprising a first normally conductive electron control device having first and second control electrodes and an output electrode; means applying a continuous train of horizontal sync pulses to said first control electrode of said device, said pulses being 1H apart; means applying a cutoff gate signal to said second control electrode of said device, said gate signal having a duration of 6H, whereby said device is cutoff for said duration and a gapped train of horizontal sync pulses in inverted form appears at said output electrode; a second, normally off, electron control device having two control electrodes and an output electrode; means applying a train of pulses coinciding and inverted with respect to said horizontal sync pulses to one of said control electrodes of said second device; means applying said cutoff gate signal in inverted form to the other said control electrode of said second device to cause said second device to conduct for the duration of said gate signal whereby a serrated gate signal having horizontal sync pulses appears at said output electrode of said second device; and common load means connected to each said device to combine the outputs of said output electrodes.

8. The device of claim 7 wherein said coinciding inverted pulses are ½H apart.

References Cited in the file of this patent

UNITED STATES PATENTS

| | | |
|---|---|---|
| 2,132,655 | Smith | Oct. 11, 1938 |
| 2,231,829 | Lewis | Feb. 11, 1941 |
| 2,535,247 | White et al. | Dec. 26, 1950 |
| 2,761,895 | Snyder | Sept. 4, 1956 |